Feb. 14, 1950

R. W. EARLEY ET AL 2,497,718

DISPENSING APPARATUS

Filed Jan. 10, 1945

WITNESSES:
William H. Swezey
Vincent W. Novak

INVENTORS
EVERT S. WEGMAN,
ROBERT W. EARLEY.
BY
ATTORNEY

INVENTORS
EVERT S. WEGMAN,
ROBERT W. EARLEY.
BY
ATTORNEY

Feb. 14, 1950 R. W. EARLEY ET AL 2,497,718
DISPENSING APPARATUS
Filed Jan. 10, 1945 3 Sheets-Sheet 3
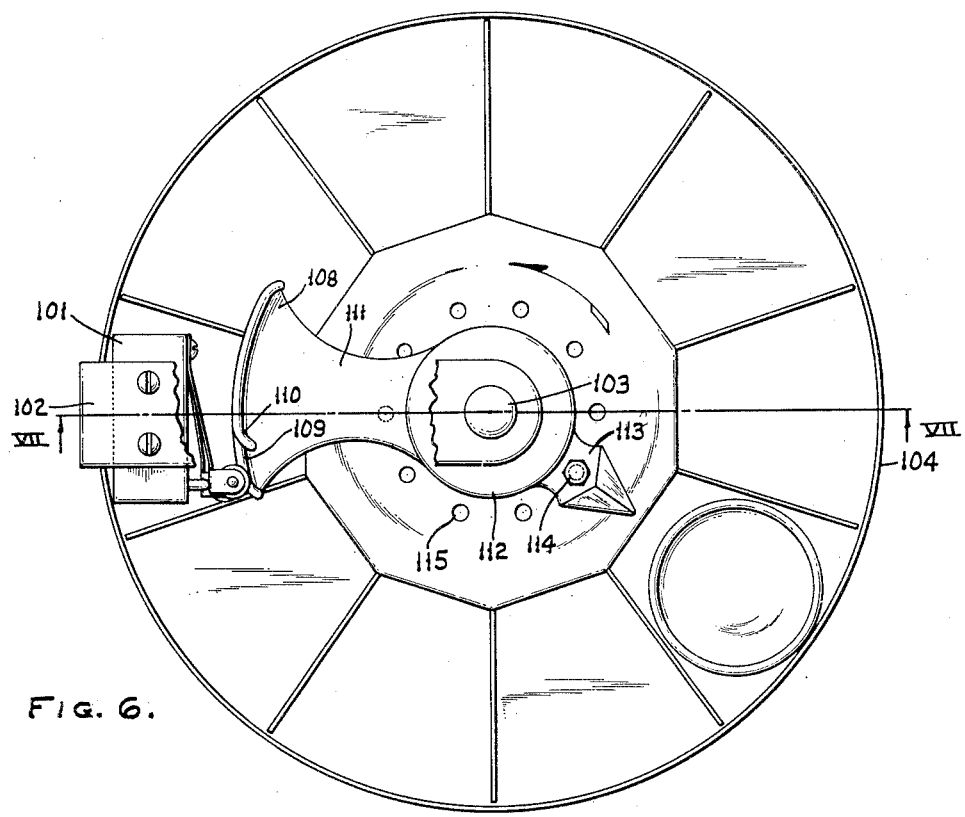
FIG. 6.
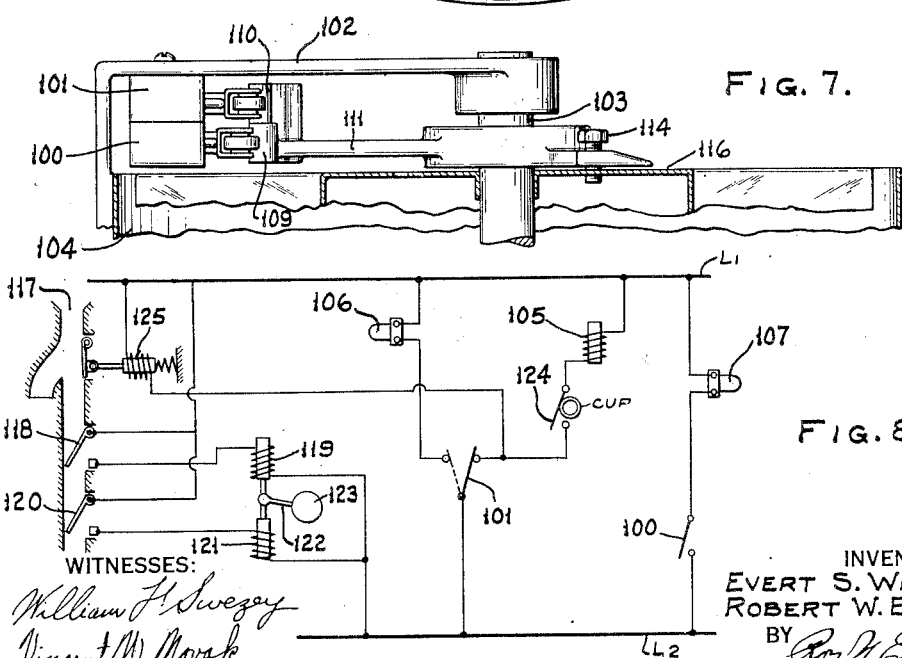
FIG. 7.
FIG. 8.
WITNESSES:
William H. Swezey
Vincent M. Novak
INVENTORS
EVERT S. WEGMAN,
ROBERT W. EARLEY.
BY
Roy N. Earley.
ATTORNEY Patented Feb. 14, 1950

2,497,718

UNITED STATES PATENT OFFICE 2,497,718

DISPENSING APPARATUS

Robert W. Earley, Burlington, Vt., and Evert S. Wegman, East Longmeadow, Mass., assignors to Westinghouse Electric Corporation, East Pittsburgh, Pa., a corporation of Pennsylvania Application January 10, 1945, Serial No. 572,134

2 Claims. (Cl. 312—44)

This invention relates to dispensing mechanisms and particularly to that type of dispensing mechanism wherein several columns of stacked articles are supported in a rotatable turret and the articles are individually dispensed from one column, whereupon that column is automatically replaced by another column. This sequence continues until all the columns have been exhausted.

The invention particularly relates to an article-dispensing and turret-rotating mechanism in which the mechanism for dispensing the articles and rotating the turret is electrically controlled.

For convenience, we shall hereafter specifically call the articles to be dispensed "cups," but it is apparent that the invention is equally applicable to the dispensing of any stacked article, for example, ice cream bars, candy bars, soap, whose presence or absence can cause actuation of a device responsive to the presence or absence of an article.

It has heretofore been proposed to provide a cup dispenser comprising a rotary turret supporting several columns of stacked cups, with one column always in position over the dispensing outlet. The individual cups may be dispensed from the column manually or electrically by known devices. A finger bearing against the lower cups in the column holds open a switch controlling an electric circuit. When the column has become exhausted to the point where the finger is released, the circuit closes and the turret is rotated under the control of an electrical responsive device until a succeeding column of cups drops into the dispensing outlet, thereby engaging the finger and causing the switch to open the circuit to the electrical responsive device.

However, in an apparatus as here described, when all the columns have been removed from the turret, the finger remains in its circuit-closing position keeping the electrical responsive device energized, and the turret will continue to rotate, seeking futilely for columns which do not exist.

The present invention has among its objects:

(1) To provide means for preventing rotation of the turret when the last column of cups is exhausted.

(2) To provide means for signaling the presence of the last column of cups in the dispensing mechanism as well as means for signaling that all or substantially all of the cups have been dispensed from the apparatus.

(3) To provide means whereby the person filling the turret can indicate the last column to be dispensed whereby the controlling mechanism will function when that column has been reached.

The mechanical movements per se which dispense the cups and rotate the turret are no part of our invention, which lies in the various controlling mechanisms herein described and claimed.

These and other objects are effected by the invention as will be apparent from the following description and claims taken in connection with the accompanying drawings, forming a part of this application, in which:

Fig. 6 is a plan view of an alternative form of dispensing mechanism;

Fig. 7 is a section taken on line VII—VII of Fig. 6, but showing the turret control switches and their actuating members in full elevation; and Fig. 8 is a wiring diagram of the control circuit for the alternative form.

Figure 1:
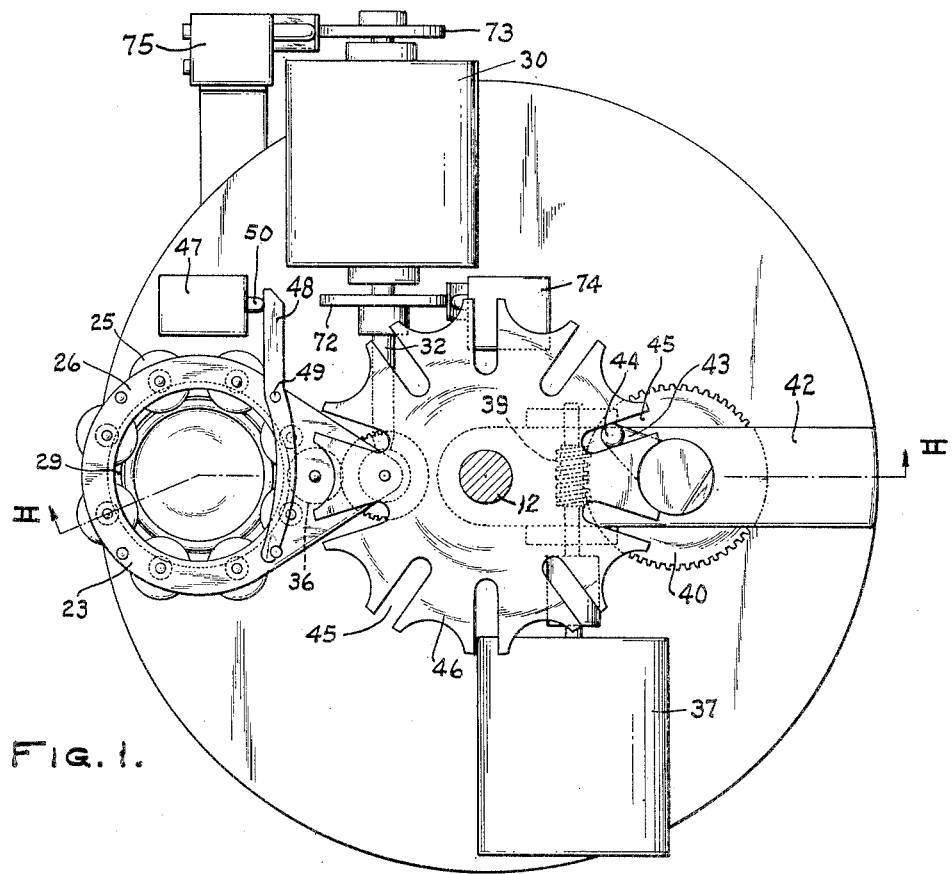
Fig. 1 is a view taken on line I—I of Fig. 2 and showing the operating parts of a dispensing mechanism embodying our invention.

A rotating turret for holding a plurality of columns of stacked articles to be dispensed is indicated at 10. This turret is surrounded by a stationary casing 11. The turret itself is supported on a vertical shaft 12 having a lower bearing 13 and an upper bearing 14. The upper bearing is formed in a bracket 15 spaced horizontally above the top of the turret and having a depending leg 16 attached to the casing 11.

The turret comprises an upper plate 17 and a lower plate 18 both fixed to rotate with the shaft and joined by a surrounding tube 19, here shown as decagonal, and provided with vanes 20 which extend from the apex of each angle of tube 19 substantially to the surrounding casing 11. This construction provides storage space for ten columns of approximately one hundred cups each.

Figure 2:
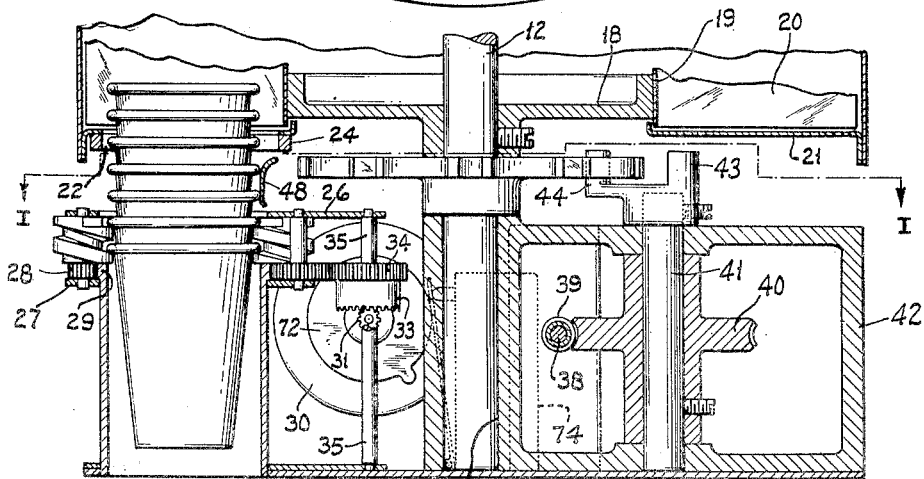
Fig. 2 is a section taken on line II—II of Fig. 1.
Figure 3:
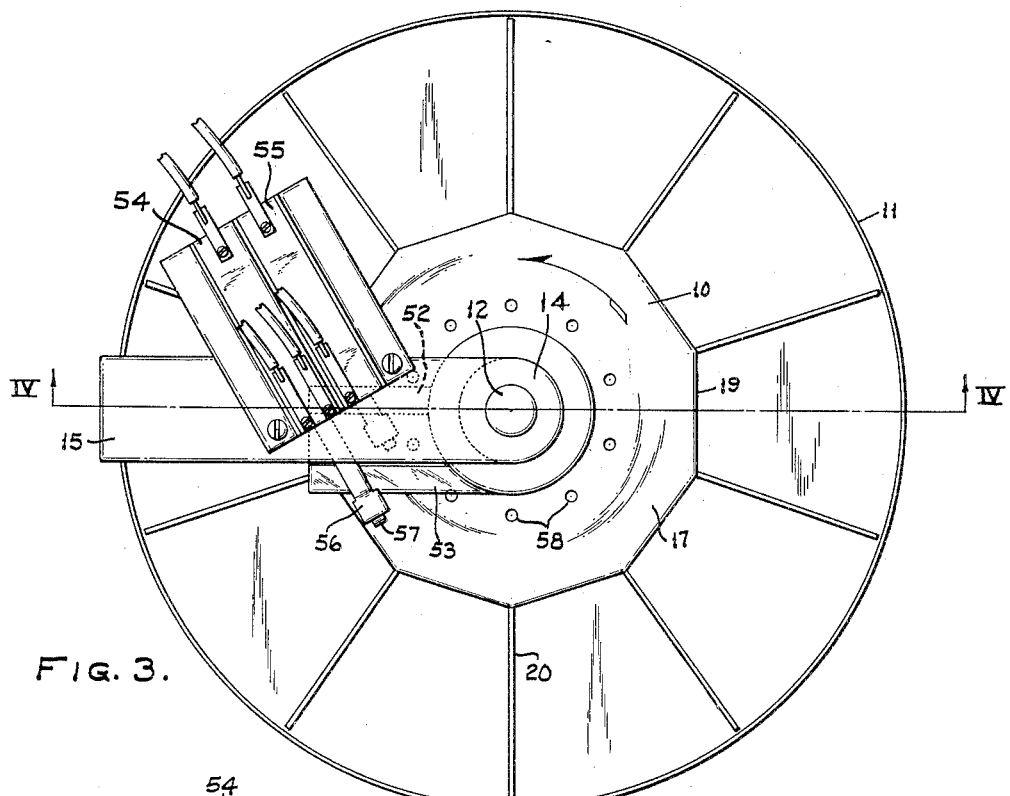
Fig. 3 is a plan view of the top of the dispensing mechanism.
Figure 4:
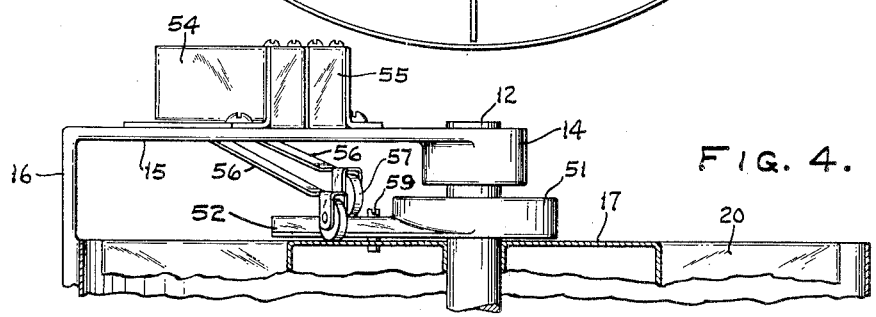
Fig. 4 is an elevation in partial section taken on line IV—IV of Fig. 3.

As the turret rotates, the cup columns slide on a circular plate 21, flanged on its outer edge and secured to the casing 11 (Fig. 2). Plate 21 has a circular opening 22, through which the columns successively drop to the dispensing mechanism 23. The rim of the opening 22 may be reinforced by a ring 24.

The mechanism for dispensing individual cups from the column is well known in the art and is of the type disclosed in the Wessman Patent No. 1,662,650, issued March 13, 1928. It comprises a set of equally spaced worm gears 25, each rotatably mounted between an upper plate 26 and a lower plate 27. These worm gears serve as supports for the cup stack and for the immediate cup to be dispensed, the threads of the worm being so arranged that the upper surface supports the stack while the lower surface supports the cup to be dispensed, all as explained in the aforesaid Wessman patent. Each worm gear has a pinion 28 attached to or formed integrally with it. This pinion is preferably disposed between the lower surface of the worm gear and the plate 27. The pinions engage an externally toothed ring gear 29 which is driven from the cup-dropping motor 30 through a beveled gear 31 attached to the motor shaft 32 and meshing with a beveled crown gear 33. The crown gear has a spur gear 34 formed on its upper surface and both of these gears are mounted on a rotatable shaft 35. Spur gear 34 drives an idler gear 36 which meshes with ring gear 29. The ring gear has a depending cylindrical extension which serves as a guide and shield for the cups to be dispensed.

The mechanism for rotating the turret to dispose a new column of cups in the opening 22 comprises a motor 37 suitably geared down and driving a shaft 38 on which is a worm gear 39. The worm gear meshes with a spur gear 40 mounted so as to rotate with a shaft 41, this shaft being rotatably mounted in a hollow frame 42. The upper end of shaft 41 projects beyond the frame 42 and carries a Geneva cam 43 rotatable with the shaft. The pin 44 of the cam periodically engages slots 45 of an indexing gear 46 to intermittently rotate that gear, which is fixed to the main turret shaft 12. The number of slots 45 is equal to the number of columns of cups, so that each complete rotation of spur gear 40 and pin 44 brings a new column to the opening 22.

The turret motor 37 is ordinarily controlled by a sensitive, normally spring-closed switch 47 which is opened by a lever 48 pivotally mounted, as at 49, on upper plate 26 and closes when the pressure of the lever is relieved. The lever is held in switch-opening position by the presence of cups in the space below opening 22, as shown in Fig. 2. However, when the column has become exhausted to the point where the level of the few remaining cups is below the adjacent arm of lever 48, the lever swings clockwise (Fig. 1) under the influence of spring-pressed push button 50 of switch 47, whereupon the switch closes and the turret motor rotates until the succeeding column drops into the opening 22 and engages the lever 48 to open switch 47.

The structure as described to this point forms in itself no part of applicants' invention. However, the structure as described has the inherent disadvantage that when the last column of cups has been exhausted, the lever arm 48 will remain in the position in which the switch 47 is continuously closed and the turret will, therefore, rotate continuously.

Our invention provides the following means, together with the foregoing structure, for (1) signaling the presence of the last column of cups to be dispensed, (2) controlling the operation of the turret motor when the last column has been exhausted together with means for indicating that the cup supply is exhausted, and (3) returning a deposited coin to the customer when no cups are available, or when a cup is being dispensed, or when the turret is rotating.

A member 51 is mounted on turret shaft 12 and rotates freely about that shaft on top plate 17. Member 51 has a flat horizontal arm 52 whose forward edge 53 is tapered downwardly toward the plane of plate 17 in the direction of rotation of the turret. A pair of sensitive switches 54, 55 are mounted on the bridge 15 above plate 17. Each switch is actuated by an arm 56 carrying a roller 57 which normally rides on the plate 17. Switch 54 is a single pole, double-throw switch and switch 55 is a single pole, single-throw switch. The plate 17 is provided with a series of perforations 58 equal in number to the number of cup column partitions. These perforations are adapted to be engaged by a pin 59 extending through the arm 52.

In the operation of the device, the arm 52 is rotated by the operator servicing the machine to point to the last column of cups in the sequence of rotation of the turret and is locked in that position by the pin 59 engaging the corresponding perforation 58. Assuming that the turret has been filled to capacity with ten columns, the arm 52 is pointed to the column which will be the last to drop into the dispensing opening 22. As the turret rotates to drop successive columns, the switches 54, 55 are inactive, with their wheels 57 freely riding on plate 17 until the tenth column drops into opening 22. As the turret reaches this position, tapered edge 53 of arm 52 picks up the roller attached to switch 55 and raises it to the top of arm 52, which is sufficiently high to cause the corresponding arm 56 to close a circuit through switch 55 from line conductor $L_1$ through switch 55, conductor 60, lamp 61 and conductor 62 to line conductor $L_2$. In the meantime, switch 47 controlling operation of turret motor 37 has been opened at contact 64 by the dropping of the last column of cups into opening 22. Thus the presence of the last column of cups is indicated by the lighting of lamp 61, which is preferably green.

When the supply of cups in the last column has dropped to the point where lever 48 is released, switch 47 closes at contact 64 to complete a circuit from $L_1$ through conductor 63, switch 47, contact 64, switch 54, contact 65, turret motor 37 and conductor 66 to $L_2$. Thus the turret motor starts to rotate. However, a very slight rotation is sufficient for edge 53 of arm 52 to pick up the roller 57 of switch 54 and so break the turret motor circuit at contact 65, stopping this motor even though switch 47 is closed. The pole of switch 54 is moved from contact 65 to contact 67, closing a circuit from switch 54 through conductor 68, lamp 69 and conductor 70 to $L_2$. Thus lamp 69, preferably red, signals that the machine is empty.

The cup drop motor 30 is provided with a shaft 71 carrying cams 72, 73 at opposite ends. Cam 72 controls a switch 74 biased to closed position but held open by the cam 72 when the motor 30 is at rest, and cam 73 controls a normally closed switch 75. A momentary contact switch 76 is disposed in the coin chute 77 and is adapted to be momentarily closed by the passage of a coin through the chute. Closing of this switch energizes the cup dropping motor 30 from $L_1$ through conductor 78, switch 76, conductor 79, motor 30 and conductor 80 to $L_2$. Motor 30 then rotates cam 72 to permit switch 74 to close and maintain the circuit through motor 30 from $L_1$ through conductor 78, switch 74, conductor 79, motor 30 and conductor 80 to $L_2$. The circuit is maintained until the motor has made a complete revolution whereupon cam 72 breaks the circuit at switch 74.

Figure 5:
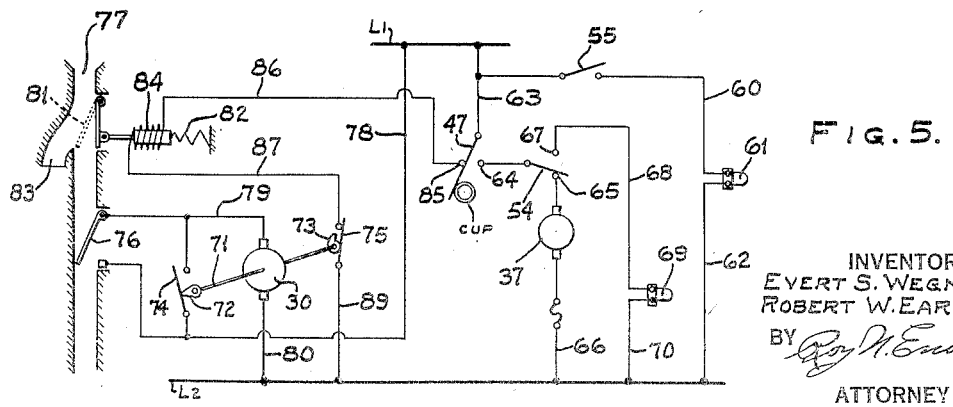
Fig. 5 is a wiring diagram of the control circuit.

So that a coin may be returned to the customer if either the turret motor or the cup dropping motor is operating, or if there are no more cups to be dispensed, a deflector 81 is provided in the coin chute 77 above the switch 76. This deflector is normally forced by spring 82 to the dotted line position of Fig. 5, blocking chute 77 and returning coins to return chute 83. The deflector is held in the non-deflecting or full line position of Fig. 5 when a solenoid 84 is energized. The energization of this solenoid is controlled by the cup switch 47 and the cam-controlled switch 75 which are connected in series with solenoid 84. Switch 47 is a single pole, double-throw switch which engages contact 64 when no cup is present but otherwise engages its other contact 85. Thus when a cup is in position to influence switch 47, and motor 30 is at rest, the solenoid 84 is energized so that a coin is free to drop down chute 77 and close switch 76. This circuit starts at $L_1$ and passes through conductor 63, the pole of switch 47, contact 85, conductor 86, solenoid 84, conductor 87, switch 75 and conductor 89 to $L_2$. Should contact 85 be broken, as by the absence of a cup influencing lever arm 48, solenoid 84 will be deenergized, deflecting coins to the return chute and the same will be true if the contact through switch 75 is broken by cam 73 as the cup-dropping motor rotates.

Referring to the embodiment shown in Figs. 6 to 8, the invention is shown as applied to a well-known rotating turret of the spring wound type, that is, where a spring tends to rotate the turret, which is restrained by a latch acting on a ratchet wheel rotatable with the turret. This latch is periodically released by a solenoid energized in response to a switch closed by the absence of cups at the dispensing station, as is the switch 47 in the previously-described embodiment.

The cup-dropping mechanism may be any well-known type, actuated in this case by a pair of solenoids which reciprocate a lever, first in one direction to drop a cup and then in the other to sustain the column for the succeeding operation.

With this type of turret, the solenoid for releasing the latch which normally restrains the turret would be continuously energized when the last column of cups has been dispensed just as the turret motor 37 would be continuously energized in the previous embodiment. To prevent this, and to signal the presence of the last column of cups at the dispensing station, we provide a pair of normally open switches 100, 101 mounted one above the other on a bracket 102 extending from the center shaft 103 of the turret to the stationary casing 104 surrounding the turret. Switch 101, a single pole, double-throw switch, deenergizes the turret solenoid 105 and turns on a red light 106 to signal the cups are exhausted, while switch 100, a single pole, single-throw switch turns on a green light 107 when the last column of cups at the dispensing station is in dispensing position.

The switches 100, 101 are successively actuated by a cam member 108 having a lower segment 109 for engaging switch 100 and an upper cut-away segment 110 for engaging switch 101 on subsequent rotation of the turret. The cam member 108 is supported on a horizontal arm 111 carried by a disc 112 freely rotatable about shaft 103. A pointer 113, also attached to disc 112, indicates the position of the last stack of cups to be dispensed. The pointer is set by the service man and is maintained in the set position by a pin 114 extending through a hole in the pointer and corresponding hole 115 formed in the top rotating horizontal wall 116 of the turret, a hole 115 being provided for each stack of cups.

Referring to Fig. 8 for the operation of this embodiment, the turret being wound up, a coin inserted in the chute 117 first actuates momentary contact switch 118 to temporarily energize solenoid 119, and then actuates momentary contact switch 120 to temporarily energize solenoid 121. These solenoids are energized and deenergized successively so that they reciprocate arm 122 attached to cup-dropping mechanism 123 to dispense a cup.

There being cups in the column being dispensed, and switch 101 being closed in the full line position, switch 124 controlled by the presence or absence of cups in the column is held open and latch-releasing solenoid is deenergized. When the cup supply in the column at the dispensing station is exhausted, switch 124 closes to energize solenoid 105 from $L_1$ through the solenoid and switches 124 and 101 to $L_2$. The energization of solenoid 105 releases a latch which normally restrains the turret against rotation under spring influence and the turret rotates until the succeeding column drops into dispensing position, opening switch 124 and releasing solenoid 105.

When the turret has rotated to the point where the last column of cups is in dispensing position, segment 109 of cam member 108 engages switch 100 to close a circuit through green light 107. When the cups in the last column have been dispensed to the point where switch 124 is closed, the solenoid 105 is energized and the turret rotates until segment 110 of cam member 108 engages switch 101 to throw it from the full line to the dotted line position (Fig. 8). Thereupon, the circuit through solenoid 105 as well as the circuit through coin deflector solenoid 125 is broken, while the circuit through red light 106 is closed. The coin deflector is spring pressed to the coin reject position as in the previous embodiment.

While the invention has been shown in but two forms, it will be obvious to those skilled in the art that it is not so limited, but is susceptible of various changes and modifications without departing from the spirit thereof.

What is claimed is:

1. A rotatable turret for holding a plurality of columns of articles to be individually dispensed, means common to all of said columns for individually dispensing the articles comprised in the same, means including an electric motor for moving the columns successively to the common dispensing means, a switch responsive to the disposition of articles adjacent and in operative relation with the common dispensing means for controlling said motor when the dispensing column of articles is substantially exhausted, said switch being normally closed in the absence of articles at the dispensing means, and means including a switch responsive to movement of the turret for breaking the circuit to said motor when the last column of articles to be dispensed has been substantially exhausted, said last-mentioned means including a switch-actuating member rotatable with the turret and adjustable to indicate the last column of articles to be dispensed.

2. A rotatable turret for holding a plurality of columns of articles to be individually dispensed, means common to all of said columns for individually dispensing the articles, comprised in the same, means including an electric motor for moving the columns successively to the common dispensing means, a switch responsive to the disposition of articles adjacent and in operative relation with the common dispensing means for controlling said motor when the dispensing column of articles is substantially exhausted, said switch being normally closed in the absence of articles at the dispensing means, means for signalling the substantial depletion of a selected column of articles to be dispensed, and means including a switch responsive to movement of the turret for breaking the circuit to said motor when the selected column of articles has been substantially exhausted and for closing the circuit to said signalling means, said last-mentioned means including a switch-actuating member rotatable with the turret and adjustable to indicate the last column of articles to be dispensed.

ROBERT W. EARLEY.
EVERT S. WEGMAN.

REFERENCES CITED

The following references are of record in the file of this patent:

UNITED STATES PATENTS

| Number | Name | Date |
| --- | --- | --- |
| 2,019,016 | McLellan | Oct. 29, 1935 |
| 2,189,740 | Mills | Feb. 6, 1940 |
| 2,256,976 | Ford | Sept. 23, 1941 |
| 2,278,013 | Nicholson | Mar. 31, 1942 |
| 2,314,632 | Rear | Mar. 23, 1943 |
| 2,352,858 | Nicholson | July 4, 1944 |
| 2,360,241 | Kuhl | Oct. 10, 1944 |
| 2,376,403 | Thompson et al. | May 22, 1945 |
| 2,394,262 | Reifsnyder et al. | Feb. 5, 1946 |